United States Patent [19]
Pelzer

[11] Patent Number: 5,935,677
[45] Date of Patent: Aug. 10, 1999

[54] TEXTILE FLOOR COVERINGS IN MOTOR VEHICLES

[75] Inventor: Helmut Pelzer, Witten, Germany

[73] Assignee: HP-Chemie Pelzer Research & Development Ltd., Waterford, Ireland

[21] Appl. No.: 08/939,201

[22] Filed: Sep. 29, 1997

Related U.S. Application Data

[63] Continuation of application No. 08/360,689, filed as application No. PCT/EP93/01699, Jul. 1, 1993, abandoned.

[30] Foreign Application Priority Data

Jul. 4, 1992 [DE] Germany ............... 42 22 023

[51] Int. Cl.$^6$ ............... B32B 3/02; B31F 1/00
[52] U.S. Cl. ............... 428/85; 156/78; 156/196; 156/242; 156/390
[58] Field of Search ............... 428/95; 156/78, 156/196, 242, 390

[56] References Cited

U.S. PATENT DOCUMENTS

| | | | |
|---|---|---|---|
| 3,952,126 | 4/1976 | Dycks | 428/283 |
| 4,014,826 | 3/1977 | Yunan | 521/54 |
| 4,082,703 | 4/1978 | Duffy et al. | 260/2.5 BE |
| 4,243,617 | 1/1981 | Burge | 264/39 |
| 4,255,482 | 3/1981 | Udagawa . | |
| 4,557,774 | 12/1985 | Hoopengardner | 428/95 |
| 4,579,764 | 4/1986 | Peoples Jr. et al. | 428/95 |
| 4,683,246 | 7/1987 | Davis et al. | 521/54 |
| 4,990,399 | 2/1991 | Hoopengardner | 428/317.3 |
| 5,045,389 | 9/1991 | Campagna | 428/395.6 |
| 5,096,623 | 3/1992 | Ward et al. | 252/609 |

FOREIGN PATENT DOCUMENTS 0 278 393 A2 8/1988 European Pat. Off. .
2 245 570 1/1992 United Kingdom .

OTHER PUBLICATIONS

Derwent Japanese Patent Abstract 86/122433.
Translation of DE 40 15 413 to Voss, Nov. 21, 1991.
Translation of DE 40 38 025 to Röding, Jun. 11, 1992.
Translation of DE 36 23 789 to Pelzer, Jan. 21, 1988.
Translation of DE 31 04 835 to Schneider, Sep. 2, 1982.
Lebresne et al., "Vehicle Noise Control by Soft Components", Ingenieurs de l'Automobile, No. 653, pp. 110–115, Dec. 1989.

Primary Examiner—Terrel Morris
Attorney, Agent, or Firm—Banner & Witcoff, Ltd.

[57] ABSTRACT

A process for the preparation of a textile floor covering for a motor vehicle includes the steps of wiper blade coating a mixture (2) of foam off-cuts and a self-curing binder in a matrix form (1) of a floor panel of a motor vehicle in a desired layer thickness profile; pressing onto the mixture a textile carpet (4) provided with a heavy layer (3) thereby adjusting the desired density of the foam off-cuts; and curing the binder during the pressing to form an absorption foam backing layer and to bond the backing layer to the heavy layer. In an alternative embodiment, the absorption foam backing layer is first formed and then adhesively bonded to the heavy layer. By means of the invention a strong bond between the backing layer and heavy layer, and a uniform density and distribution of the foam off-cuts is obtainable, whereby a high degree of acoustic dampening efficiency is achieved.

25 Claims, 1 Drawing Sheet

FIG.1
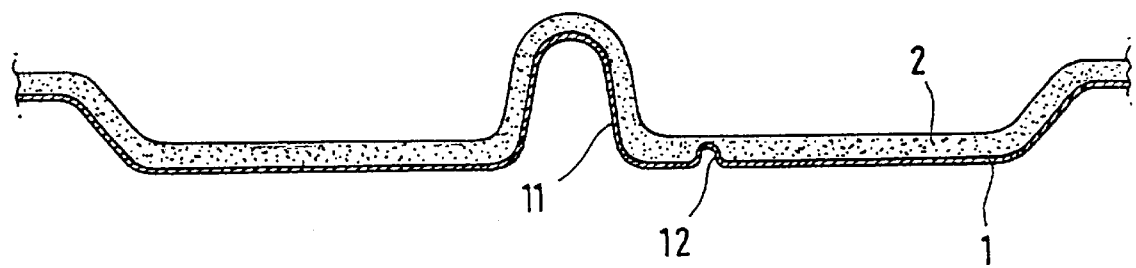
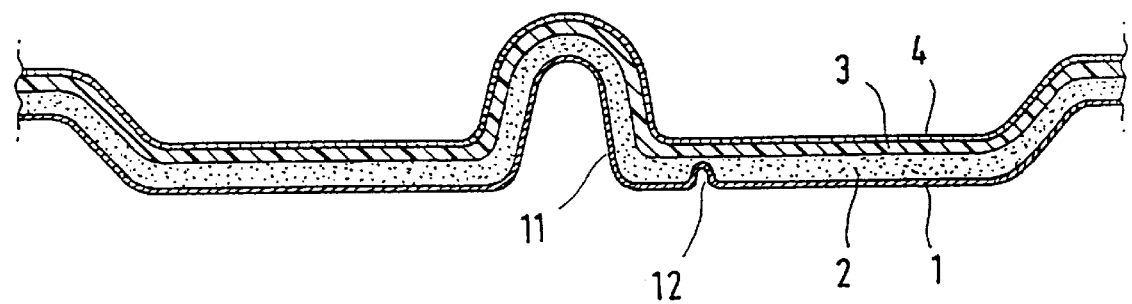
FIG. 2

TEXTILE FLOOR COVERINGS IN MOTOR VEHICLES

This application is a continuation of application Ser. No. 03/360,689, filed Jan. 4, 1995, now abandoned, which is a 371 of Ser. No. PCT/EP93/01699 filed Jul. 1, 1993.

BACKGROUND OF THE INVENTION

The present invention relates to a process for preparing textile floor coverings in motor vehicles, and a resultant product.

Textile floor coverings for motor vehicles are known per se. They are usually prepared by initially forming a textile floor layer in the form of a matrix of a floor panel of a motor vehicle. Thereby, due to the transmission tunnel or elevations and cavities being situated on the floor panel, thickness differences in the layer ranging from a few millimeters to some centimeters are produced.

Usually, velours or needled felt carpets which are coated on the backside are used. The carpets in high-quality cars are supplied with a so-called heavy layer to improve the sound insulation. This may be, for instance, an EPDM sheet containing up to 70% filler by weight.

The thus obtained laminate of backside coated carpet and heavy layer is usually subjected to a deformation to generally match the shape of the floor panel.

In order to equilibrate the unevenness of the floor panel, and for sound absorption, an absorption foam backing layer is formed according to the state of the art by means of an injection process performed on the above mentioned laminate. Particularly, it is preferred according to the state of the art to use a filled two-component polyurethane foam (heavy foam) which is injected into a mold. This polyurethane foam is effective as an acoustic dampener in combination with the heavy layer.

A particular problem arises if one attempts to include small plastic foam pieces (off-cuts), e.g., recycled off-cuts, in the absorption foam layer. Difficulties arise in maintaining an even density of the absorption foam layer. This density is preferably completely uniform over the whole area of the textile floor covering, since varying densities cause perturbations of the sound absorption system and, therefore, a diminished acoustic efficiency. Proper introduction of the material into the mold is difficult due to the low density and shape restoring elasticity of the plastic foam off-cuts. Even the presence of a suitable binder cannot resolve these problems.

From DE 40 15 413 A1 the preparation of a formed part of any form and size is known from recycling materials. The formed parts are made of foams, particularly waste foams which are torn into an off-cut form and are intensively mixed with a one-component-binder on the basis of corn and/or wheat starch. A bonding of the formed parts to other objects is not described.

DE 34 30 775 C2 relates to a carpet part, a process for the production thereof, and its use. According to this document, a carpet part for sound insulation, particularly in motor vehicles, is provided, made of a carpet and a heavy layer situated underneath it, or forming an integral whole with the carpet, and a synthetic lower layer being placed beneath it, whereby the lower layer is made of a combination of foam or non-woven fabrics having different fluid resistances. The sequence of the layers is, for instance, carpet, heavy layer, foam layer having a relatively high fluid resistance and a foam layer having a relatively low fluid resistance.

According to the state of the art, it was not possible up to the present to successfully integrate foam off-cuts into an absorption foam backing layer of a textile floor covering for a motor vehicle.

SUMMARY OF THE INVENTION

It is a principal object of the present invention to allow for the successful integration of foam off-cuts into an absorption foam backing layer of a textile floor covering for a vehicle.

This object is achieved according to the invention by a process for preparation of textile floor coverings in motor vehicles, comprising wiper blade coating a mixture of foam off-cuts and binder in a matrix mold of a floor panel of a vehicle, in a desired layer thickness profile; pressing onto the mixture a textile carpet provided with a heavy layer, the pressing adjusting the desired density of the foam off-cuts; and curing the binder during the pressing to form an absorption foam backing layer, and to bond the backing layer to the heavy layer.

The invention is further embodied in a process for preparation of textile floor coverings in motor vehicles, comprising wiper blade coating a mixture of foam off-cuts and binder in a matrix mold of a floor panel of a vehicle, in a desired layer thickness profile; pressing the mixture to adjust the desired density of the foam off-cuts; curing the binder during the pressing to form an absorption foam backing layer; and adhesively bonding the absorption foam backing layer to a heavy layer of a textile carpet.

The invention is also embodied in a textile floor covering for motor vehicles comprising a textile carpet having a heavy layer; and an absorption foam backing layer comprising a mixture of foam off-cuts and binder. The absorption foam backing layer is bonded to the heavy layer by the binder and without separate adhesive.

These and other objects, features and advantages of the present invention will be readily apparent and fully understood from the following detailed description of the preferred embodiments, taken in connection with the appended drawings.

BRIEF DESCRIPTION OF THE DRAWINGS

FIG. 1 is a partial cross-sectional view of a matrix form of a floor panel with a layer of foam off-cuts and self curing binder wiper blade coated thereon.

FIG. 2 is a partial cross-sectional view of a completed set up of layers of a textile floor covering within a floor panel mold (form).

DETAILED DESCRIPTION OF THE PREFERRED EMBODIMENTS

FIG. 1 illustrates a matrix mold of a floor panel of a motor vehicle. The transmission tunnel 11 and a cable channel 12 are protruding from the otherwise even matrix form. While the cable channel 12 is not visible from the upper surface of a wiper blade coated layer 2 made of foam off-cuts and self-curing binder, the transmission tunnel 11 is surrounded by the mixture of constant layer thickness. Those skilled in the art will appreciate that wiper blade coating involves, generally, the use of a blade passed over a form (e.g., by conventional mechanisms) to evenly distribute a coating material within the form.

The wiper blade coating of the mixture made of foam off-cuts and self-curing binder (absorption foam) 2 into the matrix mold 1 permits a liberation of the elastic shape restoring forces of the foam off-cuts in the matrix mold already at room temperature. Thereby, a practically even surface of binder and island structures (the suspended foam off-cuts) can be obtained. A uniform density is also achieved due to a uniform distribution of the foam off-cuts in the binder. The resultant layer is one which is particularly suitable for bonding to the heavy layer 3. In order to avoid bonding of the absorption foam 2 to the matrix mold 1, per se known mold-release agents can be used.

FIG. 2 illustrates a complete set up of layers of a textile floor covering in a matrix mold 1 of the automobile floor panel. A heavy layer 3 which is laminated to the textile carpet 4 is situated on and secured to the layer 2 made of foam off-cuts and self-curing binder.

It is possible to attain a good adhesive bonding of the absorption foam layer 2 to the heavy layer 3 by, for instance, pressing of the textile carpet 4 provided with a heavy layer 3 and heating of the laminate. The uniform density of the absorption foam 2 over the entire volume of the foam causes a uniform sound absorption quality.

The process according to the invention makes it possible to reuse foam off-cuts to a large extent which, for instance, are by-products of waste materials formed during the preparation of other products. In a preferred embodiment of the present invention, a mixture of 70–99% by volume of foam off-cuts and 1 to 30% by volume of binder is wiper blade coated in a matrix mold 1 of the floor panel of the motor vehicle. In a further preferred embodiment of the present invention a mixture of 75 to 90% by volume of foam off-cuts and 10 to 25% by volume of binder is wiper blade coated.

The size of the foam off-cuts is of minor importance. However, it should not exceed the slightest layer thickness of the absorption foam layer, for instance, above the cable channel 12. Otherwise, a sufficiently even surface for applying the textile carpet 4 may not be created.

Consequently, it is particularly preferred to apply foam off-cuts in a range of size from 1 to 30 mm. Since usually the thickness of the absorption foam 2 for the preparation of textile carpets 4 in motor vehicles is about 2 to 100 mm, particularly 5 to 80 mm, it is ensured upon selection of the size of the foam off-cuts that the elastic shape restoring forces of the foam off-cuts do not deteriorate the surface quality of the absorption foam 2.

The selection of the self-curing binder is practically unlimited, so long as the binder is able to strongly bond the used foam off-cuts in a sufficient way and has a sufficient elasticity to be acoustically effective. Furthermore, a sufficient wetting of the foam off-cuts is necessary, in order to create a strong compound. Also, a good bonding to the heavy layer 3 must be possible.

Correspondingly, in a preferred embodiment of the present invention, a phenol resin, a one-component polyurethane of latex emulsion, optionally filled with polyolefin fibers, for instance polypropylene fibers, is used as a binder.

In such mixtures of foam off-cuts and binder 2, the binder can cure by various means, for instance by action of temperature, water vapor and/or pressure. (Except as otherwise noted, the term "cure" is used broadly herein to refer to solidification of the binder through chemical reaction (cross-linking) and/or change of state.) A curing of the elastic binder (which can comprise thermoplastic material) leads to an acoustically effective absorption foam 2 which has about the same density over the whole volume. Therefore, the sound absorption characteristics are essentially equal over the whole volume.

There are several possibilities for creating a bond between the mixture (absorption foam) consisting of foam off-cuts and self-curing binder 2 on the one hand and the heavy layer 3 on the other hand.

In a first variation of the process according to the invention, the absorption foam 2 on the one hand and the heavy layer 3 on the other hand are bonded without an intermediate adhesive layer by self-curing of the binder. In this variation, for instance, the optionally pre-molded laminate consisting of heavy layer 3 and textile carpet 4 is pressed onto the still uncured absorption foam 2, whereby the density of the foam off-cuts is adjusted to the desired level. Next, by corresponding activation, e.g., by elevation of temperature, the binder is cured to form the finished absorption layer and, at the same time, bond the absorption layer to the heavy layer 3. The binders may be pure thermoplastic material, thermosetting material or a suitable combination thereof.

A commercial EPDM heavy layer filled with up to 70% by weight of filler can be applied for instance in the range of the present invention as a heavy layer.

In a further variation of the present invention it is possible to activate the mixture of foam off-cuts and self-curing binder 2 and to realize the bonding of the mixture 2 to the heavy layer 3 by means of an additional adhesive layer, before applying the textile carpet 4 provided with the heavy layer 3. According to this variation it is advisable to initially activate the self-curing binder and to mold (press) the absorption foam 2 into its desired geometric form and density, before applying the adhesive layer. After applying an adhesive layer on the cured mixture of foam off-cuts and self-curing binder and/or the heavy layer, and activation of the adhesive layer after bonding the parts together, the desired textile floor covering can be obtained.

Particularly preferred in the present invention is the use of an adhesive layer made of, for instance, hot-melt adhesives which are known per se, or an optionally heat activated polyethylene adhesive, polypropylene adhesive and/or latex adhesive.

As a textile carpet 4, a velours or needled felt carpet which is coated on the backside and known in the state of the art, can be used. Preferably, the laminate made of velours or needled felt which is coated on the backside with heavy layer 3, is pre-molded in a suitable manner, before applying it on the absorption foam. However, in the same way, it is possible, to carry out deformation of the textile carpet during the bonding to the absorption foam 2.

I claim:

1. A process for preparation of textile floor coverings in motor vehicles comprising:

wiper blade coating a mixture of foam off-cuts and binder in a matrix mold of a floor panel of a vehicle, in a desired layer thickness profile;

pressing onto said mixture a textile carpet provided with a heavy layer, said pressing serving to adjust the desired density of the foam off-cuts; and curing said binder during said pressing to form an absorption foam backing layer and to bond said backing layer to said heavy layer.

2. A process according to claim 1, wherein said mixture comprises 70 to 99% by volume of foam cut-offs and 1 to 30% by volume of binder.

3. A process according to claim 1, wherein said mixture comprises 75 to 90% by volume of foam off-cuts and 10 to 25% by volume of binder.

4. A process according to claim 1, wherein said foam off-cuts have a size in the range of 1 to 30 mm.

5. A process according to claim 1, wherein said binder is selected from the group consisting of a phenol resin, a one-component polyurethane and a latex emulsion.

6. A process according to claim 5, wherein said binder is filled with polyolefin fibers.

7. A process according to claim 6, wherein said polyolefin fibers are polypropylene fibers.

8. A process according to claim 1, wherein the curing of said binder is activated by a parameter selected from the group consisting of temperature, water vapor and pressure.

9. A process according to claim 1, wherein said heavy layer is an EPDM heavy layer including up to 70% by weight of filler.

10. A process according to claim 1, wherein said textile carpet comprises a backside coated velours or needled felt layer.

11. A process according to claim 1, wherein said matrix mold of a floor panel comprises uneven surface portions.

12. A process according to claim 11, wherein said uneven surface portions comprise protrusions corresponding to a motor vehicle feature selected from the group consisting of a transmission tunnel and cable channel.

13. A textile floor covering for motor vehicles produced by the process of any one of claims 1–12.

14. A process for preparation of textile floor coverings in motor vehicles, comprising:
    wiper blade coating a mixture of foam off-cuts and binder in a matrix mold of a floor panel of a vehicle, in a desired layer thickness profile;
    pressing said mixture to adjust the desired density of the foam off-cuts;
    curing said binder during said pressing to form an absorption foam backing layer having a substantially even foam density distribution; and
    adhesively bonding said absorption foam backing layer to a heavy layer of a textile carpet with a separately applied adhesive.

15. A process according to claim 14, wherein said mixture comprises 70 to 99% by volume of foam off-cuts and 1 to 30% by volume of binder.

16. A process according to claim 14, wherein said mixture comprises 75 to 90% by volume of foam off-cuts and 10 to 25% by volume of binder.

17. A process according to claim 14, wherein said foam off-cuts have a size in the range of 1 to 30 mm.

18. A process according to claim 14, wherein said binder is selected from the group consisting of a phenol resin, a one-component polyurethane and a latex emulsion.

19. A process according to claim 18, wherein said binder is filled with polyolefin fibers.

20. A process according to claim 19, wherein said polyolefin fibers are polypropylene fibers.

21. A process according to claim 14, wherein the curing of said binder is activated by a parameter selected from the group consisting of temperature, water vapor and pressure.

22. A process according to claim 14, wherein said heavy layer is an EPDM heavy layer including up to 70% by weight of filler.

23. A process according to claim 14, wherein said textile carpet comprises a backside coated velours or needled felt layer.

24. A process according to claim 14, wherein said matrix mold of a floor panel comprises uneven surface portions.

25. A process according to claim 24, wherein said uneven surface portions comprise protrusions corresponding to a motor vehicle feature selected from the group consisting of a transmission tunnel and cable channel.

* * * * *